March 7, 1933. J. RUTHS 1,900,766

STEAM POWER PLANT

Filed May 26, 1930

INVENTOR
Johannes Ruths
BY
*his* ATTORNEY

Patented Mar. 7, 1933

1,900,766

UNITED STATES PATENT OFFICE

JOHANNES RUTHS, OF DJURSHOLM, SWEDEN, ASSIGNOR TO RUTHSACCUMULATOR A. B., OF BERLIN, GERMANY, A CORPORATION OF SWEDEN

STEAM POWER PLANT

Application filed May 26, 1930, Serial No. 455,938, and in Germany June 5, 1929.

My invention relates to steam plants and more particularly to steam power plants employing steam accumulators of the type designed to store a considerable quantity of steam to be used during periods of high or peak loads. Still more particularly the invention relates to steam power plants wherein a prime mover is supplied with steam both from an original source such as a steam generator and from a storage source such as a steam accumulator.

In order to permit a supply of steam from different sources to a prime mover and have an automatic operating plant it is necessary to provide related control of the supplies. The practice has been, in the past, in cases such as referred to, and to which the present invention relates, to control both supplies in accordance with variations in speed of the prime mover. A speed governor responsive to speed of the prime mover has been connected to valve members in the supply lines from the original source and from the accumulator and so constructed, arranged and operated that the supply from the original source would be first drawn on and if this did not suffice, then the valve member controlling the supply from the accumulator would be opened. In conjunction with such regulation it has been the practice to use a valve controlling flow through the supply lines from the original source operated by the pressure ahead of the same, and consisting of that type of valve which is generally known as an overflow valve.

In certain types of plants, and particularly peak load plants, this type of regulation has some disadvantages and it is the object of the present invention to provide an arrangement constituting an improvement over the above described past practice, providing a complete automatic control best able to take care of all conditions.

The nature of the invention and the advantages thereof will become apparent on consideration of the following description taken in connection with the accompanying drawing which forms a part of this specification.

With reference to the accompanying drawing.

In modern steam plants attempts are made to keep the steam pressures in the various lines or conduits as uniform as possible. The known regulations for controlling the dual supply of steam to a prime mover, above described, did not operate to give true uniformity of steam pressures since the control is responsive to speed. As will appear, the present invention provides a control system which enables the pressure in the conduit leading from the original source, or what may be termed the live steam source, to be maintained constant or substantially constant independently of variations of load on the prime mover.

Figure 1:
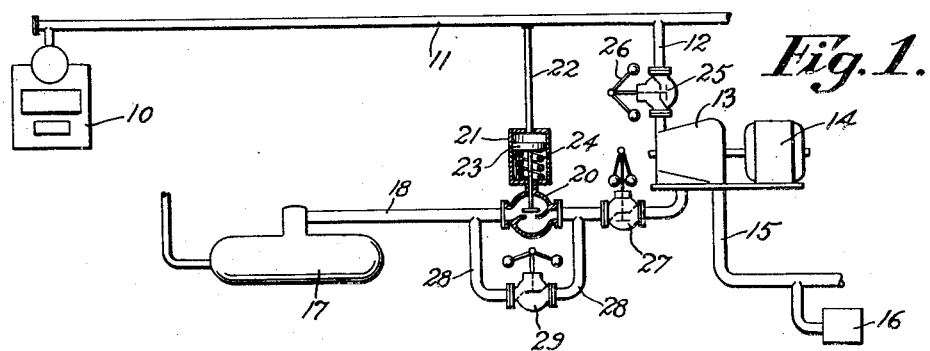
Fig. 1 is a diagram of a steam plant embodying the invention.

Referring to Fig. 1, reference character 10 designates a steam generator which may be made up of one or more steam boilers and may be fired in any desired manner. Steam generator 10 supplies steam to the live steam conduit 11. To this conduit is connected a supply line 12 leading to a prime mover 13 which may, for example, be a turbine. The turbine may drive an electric generator 14. Steam is conducted from the turbine 13 through a conduit 15, for example, to low pressure consumer 16.

Reference character 17 designates an accumulator which is a large steel vessel capable of holding a large quantity of water. This accumulator holds water at boiling temperature. The accumulator may be supplied with live steam from the steam generator 10 or from some other source.

A conduit 18 connects the steam dome of the accumulator with the turbine 13. The accumulator steam being of lower pressure than the live steam is preferably admitted to an intermediate point of the turbine. In conduit 18 is a valve 20 which is operated by a regulator 21 subject to variations of steam pressure in conduit 11 by means of tube 22. The valve and its regulator may be of any of various known constructions and I have indicated the valve diagrammatically as being operated by a piston 23 on the one side of which the steam pressure of conduit 11 acts, and on the other side of which a spring 24 acts. On rise of pressure in conduit 11 valve 20 is closed more or less and on drop of pressure in conduit 11 the valve opens more or less, within a given range. In conduit 12 is a valve 25 which is operated by a speed governor 26 responsive to variations of speed of turbine 13. This speed governor operates to maintain a constant speed of the turbine and therefore the regulator acts to open the valve on decrease of speed and conversely closes the valve on rise of speed.

In conduit 18 I have provided a valve 27 which is normally open but which closes in event that the speed of the turbine becomes excessively high. I also provide a by-pass conduit 28 containing a valve 29. Valve 29 is operated in accordance with the speed of the turbine and is acted upon to open in event that the speed decreases below the predetermined low value.

The operation of this plant is as follows:

Assuming first that the load on the prime mover remains constant and that the pressure in conduit 11 varies, due, for example, to cutting in or out consumers connected to conduit 11 or to variations in the rate of steam production in the steam generator 10. Assuming that the steam pressure rises in conduit 11, the rise in steam pressure is transmitted thru tube 22 and acts to move the piston 23 against the counteracting force of spring 24, thereby closing the valve 20 to a greater or less extent. This diminishes the supply of steam to the prime mover from the accumulator. The result is to decrease the speed of the turbine, this, in turn, causing regulator 26 to open valve 25 wider, as a result of which more steam flows through conduit 12. Consequently the pressure drops in conduit 11 due to the increased flow through conduit 12, and as a result the pressure is returned to the normal operating value in conduit 11.

If the pressure in conduit 11 decreases below its normal value, valve 20 is opened more or less and the speed controlled valve 25 is operated to decrease the flow of steam therethrough, as a result of which the pressure in conduit 11 is returned to normal.

Assume now that there are no variations of pressure in conduit 11, but that the load on the prime mover varies. The operation will then be as follows:

On increase of load, the speed of the turbine first decreases, as a result of which the speed responsive regulator increases the supply of steam through conduit 12. This causes a slight drop of pressure in conduit 11, as a result of which valve 20 is opened. The opening of valve 20 allows more steam to pass from the accumulator to the turbine. The speed then increases somewhat and the speed responsive regulator 26 closes, more or less, the valve 25 to decrease the supply from conduit 12. Thus it will be seen that the change in load operates to withdraw steam from the respective sources in such manner as to maintain, due to the automatic regulation, a constant or substantially constant pressure in conduit 11. On decrease of load the reverse process occurs, that is, the speed governor 26 first closes valve 25 somewhat, the pressure in conduit 11 rises somewhat, valve 20 is closed somewhat and the speed governor returns the valve member of valve 25 to or toward its previous position.

It will be seen that if there is a simultaneous variation in both the live steam conduit pressure and the speed of the turbine that the regulation will nevertheless take care of these variations to supply the proper amount of steam and maintain a constant or substantially constant pressure in conduit 11. The supply of steam to the prime mover is thus governed in the first instance by pressure conditions in the live steam conduit, and in the second instance by the speed of the prime mover.

As a rule, the regulation just described is sufficient. Should it happen, however, that the load on the prime mover should decrease to an abnormally low value and the pressure in the live steam conduit 11 should fall at the same time below its normal value, the accumulator steam supply would be opened wider than would correspond to the momentary load on the prime mover and consequently the demand for steam. This might have no adverse effect in a plant in which there is a high pressure consumer connected to the conduit 11 in addition to the turbine. If, however, the prime mover 13 operates alone, its speed might become too high. In order to avoid this, I have provided a valve 27 which is operated in response to variations of speed of the turbine. This valve is normally open and only causes a decrease of steam supply from the accumulator on rise of the speed of the prime mover above an abnormally high predetermined value. As an impulse for the regulation of the speed of a prime mover, the speed itself is obviously more direct and quicker acting than variations in a steam pressure value resulting from variations of speed of the prime mover.

Assume now that there is an unusually high load on the prime mover and that the pressure in conduit 11 at the same time rises materially above normal. This might close valve 20 and the accumulator would be unable to supply the required amount of steam for the momentary demand. To take care of this condition I have provided a by-pass 28 and in the event that the speed of the prime mover decreases below an abnormally low predetermined value, valve 29 opens to admit steam to the turbine independently of the operation of valve 20. Valve 29 is normally closed tight.

Figure 2:
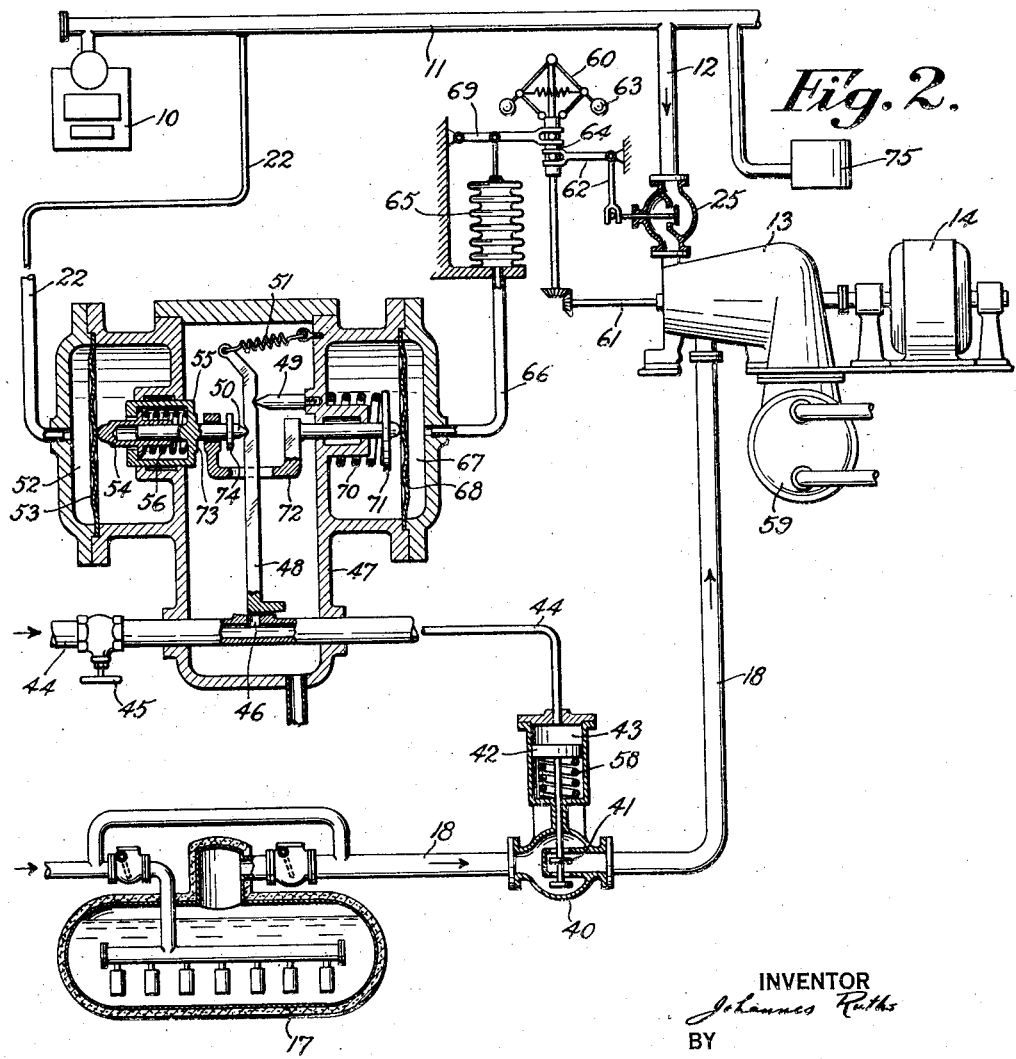
Fig. 2 is another showing of a steam plant embodying the invention in which a plurality of functions are concentrated in a single valve mechanism.

The regulation of the supply of steam to the prime mover by means of valves 20, 27 and 29 may be controlled by a single regulator operated in response to a plurality of impulses. I have shown such an arrangement in Fig. 2. In the figures like reference characters designate like or corresponding parts. The turbine is shown as of the condensing type rather than of the back-pressure type, the condenser being indicated at 59. In the conduit 18 leading from the accumulator 17 is the valve 40 which is operated to take over the functions of the three valves 20, 27 and 29 of Fig. 1. The valve member 41 is operated by a piston 42 subjected to the pressure of a fluid in the chamber 43 on one side and to the force of a spring 58 on the other side. The fluid for operating the valve may be a liquid such as oil supplied from the conduit 44. A restriction is provided in conduit 44 and diagrammatically indicated as a hand valve 45. Between valve 45 and chamber 43, in conduit 44, is an opening 46 which permits the oil to be let out into a relay housing 47. The opening or port 46 is controlled by a relay lever 48 held against a fixed pivot 49 and a movable pivot 50 by means of a spring 51. In the relay housing is a chamber 52, one side of which is formed by a diaphragm 53. A meber 54 abuts against diaphragm 53 and has relative movement with respect to member 55 which carries the movable pivot 50. Tube 22 is connected to chamber 52 so that variations of steam pressure in conduit 11 are transmitted to chamber 52 and act against diaphragm 53. A spring 56 interposed between members 54 and 55 normally acts as a stiff member so that there is no relative movement of these parts.

With respect to normal operation of this arrangement: If the steam pressure rises in conduit 11 the rise of steam pressure is transmitted through tube 22 to chamber 52. Diaphragm 53 moves to the right, as shown, whereby lever 48 is swung in counter clockwise direction causing an opening of port 46. Outflow of liquid from port 46 causes a decrease of pressure in conduit 44, between restriction 45 and chamber 43, and also in chamber 43. The spring 58 then overcomes the fluid pressure in chamber 43 and valve member 41 is moved to or toward closing position. Consequently, the supply of steam from the accumulator through conduit 18 is diminished. It will be seen that this operation is the same as that of the valve 20 of Fig. 1.

The speed governor 60 is driven from the turbine shaft 61. This speed governor operates the valve 25 in the manner described in connection with Fig. 1, for which purpose I have shown the speed governor as connected by a bell crank 62 to the valve spindle of valve 25. As the speed increases the balls swing outwardly and raise the sleeve 64, thereby causing valve 25 to close more or less. To illustrate how the speed governor 60 may act on valve 40, I have shown a bellows member 65 connected by tubing 66 with a chamber 67 in the relay housing 47. A diaphragm 68 forms one wall of chamber 67. Bellows 65, tube 66 and chamber 67 contain a noncompressible fluid such as oil. The upper end of bellows 65 is attached to a lever 69, which is moved by sleeve 64. In the relay housing 47, a spring 70 acts against member 71, urging it against diaphragm 68. To member 71 is attached a yoke 72 which operates between abutment 73 on the side of member 55 and an abutment 74. In the normal operation of the regulator above described, the yoke 72 does not move, or its movement does not affect the regulation. The yoke, during normal operation, moves or is stationary between abutments 73 and 74, without contacting these abutments.

Should the speed of the turbine rise above a predetermined high value, lever 69 is moved upwardly as a result of which diaphragm 68 moves to the right, as shown. Yoke 72 then contacts abutments 74, moving lever 48 to uncover port 46. This reduces the pressure in chamber 43 and causes a closing of valve 40. It will thus be seen that this regulation is the same as that of valve 27 of Fig. 1.

If the speed should decrease below an abnormal low predetermined value, the lever 69 is moved downwardly and diaphragm 68 is moved to the left, as shown, as a result of which yoke 72 contacts abutment 73, thereby moving lever 48 to cover port 46. This increases the pressure in chamber 43 and causes an opening of valve 40 regardless of the tendency of the pressure in conduit 11 to close the valve. Spring 70 is stronger than spring 56, the parts being such that the force moving yoke 72 can overcome the pressure in chamber 52. When yoke 72 contacts abutment 74, the parts 54 and 55 can separate, so that the steam pressure in chamber 52 has no effect. It will thus be seen that the one valve 40 and the regulator take over the functions of valves 20, 27 and 29 of Fig. 1.

I have shown a consumer 75 connected to receive steam from conduit 11. It will be obvious that a prime mover other than turbine may be used, and that the prime mover may be one of many kinds of prime movers. The supply pipe from the accumulator may be connected to separate stages of the prime mover.

It will be obvious that other plant equipment may be used in connection with my invention, and that the invention is not limited to any specific structural embodiment.

As will appear from the appended claims, the term "source of steam" is not intended to be limited to a steam generator but may be a conduit or other place from which steam is received for use in a prime mover.

What I claim is:

1. A steam plant comprising, in combination, a source of steam of relatively high pressure, a source of steam of relatively low pressure, a prime mover supplied with steam from both of said sources, means to control the supply of steam from the high pressure source in response to variations of speed of the prime mover, means to control the supply of steam from the low pressure source in accordance with variations of steam pressure in the high pressure source, said last-mentioned means being adapted to shut off steam from the low pressure source while permitting flow of steam through the prime mover, and means responsive to excessively low speed of the prime mover to supply steam to the prime mover from said low pressure source independently of the pressure responsive control means.

2. A steam plant comprising, in combination, a prime mover, a source of steam of relatively high pressure, a supply conduit connecting said source with said prime mover, a valve in said supply conduit, means to control said valve in response to variations of speed of said prime mover, a source of steam of relatively low pressure, a low pressure conduit connecting said last mentioned source with said prime mover, a valve in said low pressure conduit positioned therein to restrict its control to steam from the low pressure source, means to operate the last mentioned valve in accordance with variations of pressure in said supply conduit ahead of the first mentioned valve, and means responsive to excessively low speed of the prime mover to supply steam to the prime mover from said low pressure source independently of the pressure responsive control means.

3. A steam plant comprising, in combination, a steam generator, a prime mover, a steam accumulator, a live steam conduit connecting said steam generator with said prime mover, a low pressure conduit connecting said accumulator with said prime mover, a valve in said live steam conduit operated in response to variations of speed of said prime mover, a pressure operated valve in said low pressure conduit operated by variations of pressure in said steam generator, means to close the pressure operated valve when the speed of the prime mover exceeds a high predetermined value independently of variations of pressure in the steam generator, and means to open the pressure responsive valve when the speed of the prime mover falls below a predetermined value independently of variations of pressure in the steam generator.

4. A steam plant comprising, in combination, a source of steam of relatively high pressure, an accumulator, a prime mover supplied with steam from both said source and said accumulator, means to control the supply of steam from the source in response to variations of speed of the prime mover and operating to increase the supply of steam on decrease of speed, means to control the supply of steam from the accumulator in accordance with variations of steam pressure in said source and operating to increase the supply of steam from the accumulator on decrease of pressure in said source, said last-mentioned means controlling the supply of steam from the accumulator to the prime mover independently of flow through the prime mover of the steam from the high pressure source, speed responsive means to cause flow of steam from the accumulator to the prime mover when the speed of the prime mover falls below a predetermined value independently of the pressure responsive control, and speed responsive means to shut off flow of steam from the accumulator to the prime mover when the speed of the prime mover rises above a predetermined value independently of the aforementioned control means.

5. A steam plant comprising, in combination, a prime mover, a source of steam of relatively high pressure, a supply conduit connecting said source with said prime mover, a valve in said supply conduit, means to control said valve in response to variations of speed of said prime mover and operating to increase the supply of steam on decrease of speed, an accumulator, a low pressure conduit connecting the accumulator with the prime mover, a valve in said low pressure conduit positioned therein to control flow of steam from the accumulator to the prime mover, and ahead of the path of flow through the prime mover of the steam from the high pressure source, means to operate the last mentioned valve in accordance with variations of pressure in said supply conduit ahead of the first mentioned valve and operating to increase the supply of accumulator steam on decrease of actuating pressure, speed responsive means to cause flow of steam from the accumulator to the prime mover when the speed of the prime mover falls below a predetermined value independently of the pressure responsive control means, and speed responsive means to shut off flow of steam from the accumulator to the prime mover when the speed of the prime mover rises above a predetermined value independently of the aforementioned control means.

6. A steam plant comprising, in combination, a steam generator, a prime mover, a steam accumulator, a live steam conduit connecting said steam generator with said prime mover, a low pressure conduit connecting said accumulator with said prime mover, a valve in said live steam conduit operated by speed of said prime mover, a pressure operated valve in said low pressure conduit operated by variations of pressure in said live steam conduit ahead of the first mentioned valve, and means to close the pressure operated valve when the speed of the prime mover exceeds a high predetermined value independently of variations of pressure in the live steam conduit.

7. A steam plant comprising, in combination, a steam generator, a prime mover, a steam accumulator, a live steam conduit connecting said steam generator with said prime mover, a low pressure conduit connecting said accumulator with said prime mover, a valve in said live steam conduit operated in response to variations of speed of said prime mover, a pressure operated valve in said low pressure conduit operated by variations of pressure in said live steam conduit ahead of the first mentioned valve and positioned in said low pressure conduit to limit its control to the steam supplied to the prime mover from the accumulator, and means responsive to the sped of the prime mover to open the pressure responsive valve when the speed of the prime mover falls below a low predetermined value independently of variations of pressure in the live steam conduit.

8. A steam plant comprising, in combination, steam generator, a prime mover, a steam accumulator, a live steam conduit connecting said steam generator with said prime mover, a low pressure conduit connecting said accumulator with said prime mover, a valve in said live steam conduit operated in response to variations of speed of said prime mover, a pressure operated valve in said low pressure conduit, a relay for operating said pressure operated valve, means to operate said relay in response to variations of steam pressure in said live steam conduit ahead of said first mentioned valve and operating to increase the flow of steam through said pressure operated valve on decrease of pressure in said live steam conduit, and means for operating said relay in accordance with abnormal values of speed of said prime mover for controlling the pressure operated valve independently of variations of pressure in the live steam conduit.

In testimony whereof I have affixed my signature.

JOHANNES RUTHS.